June 8, 1954  E. P. MARKOWSKI ET AL  2,680,284
METHOD OF MAKING DAMPERS FOR VIBRATION ISOLATORS
Filed Nov. 3, 1950  2 Sheets-Sheet 1

Inventors;
Edwin P. Markowski,
William W. Symonds,
by Charles E. Crede
Agent.

June 8, 1954  E. P. MARKOWSKI ET AL  2,680,284
METHOD OF MAKING DAMPERS FOR VIBRATION ISOLATORS
Filed Nov. 3, 1950  2 Sheets-Sheet 2
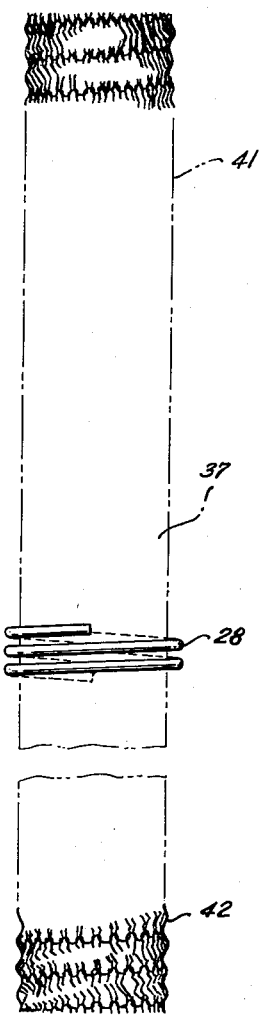
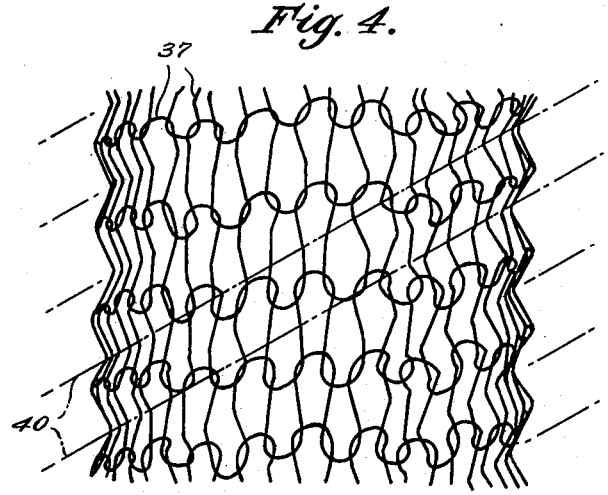
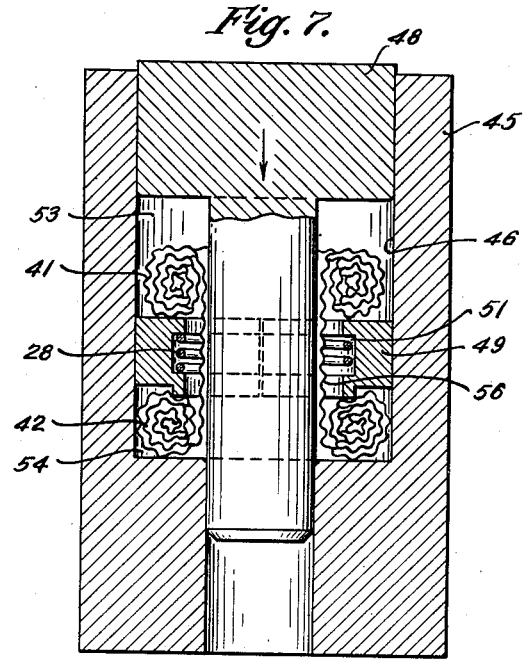
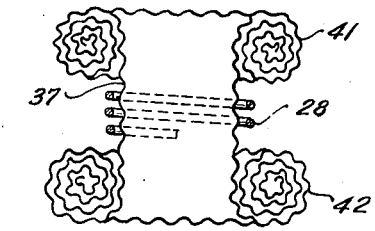
Inventors;
Edwin P. Markowski,
William W. Symonds,
by Charles E. Crede
Agent.

Patented June 8, 1954

2,680,284

UNITED STATES PATENT OFFICE 2,680,284

METHOD OF MAKING DAMPERS FOR VIBRATION ISOLATORS

Edwin P. Markowski, Dorchester, and William W. Symonds, Marblehead, Mass., assignors to The Barry Corporation, a corporation of Massachusetts Application November 3, 1950, Serial No. 193,890

5 Claims. (Cl. 29—148)

Our invention relates to flexible mountings, known as vibration isolators which are used to effect a reduction in the magnitude of vibration transmitted between structures which must be mechanically connected and more particularly to a method of making a damper for such isolators. In applications where the operation of machinery causes a vibrating force to be created within the machinery, isolators may be employed to reduce the magnitude of the force transmitted to the support for the machinery. In other applications, machinery or equipment is mounted upon a support which vibrates, and an isolator is employed to reduce the severity of vibration transmitted from the support to the equipment.

Isolators are used in aircraft for mounting delicate equipment. They protect the equipment from the vibration created by operation of the engine, by aerodynamic forces acting upon the aircraft structure, by gunfire of the plane's armament, and by taxiing, landing and taking off.

The important elements of a vibration isolator for such applications are (1) a relatively compliant spring or other resilient element for carrying the weight of the equipment, (2) a snubber to cushion the equipment when it is moved a large distance from its neutral position and (3) a damper to reduce the duration of transient vibration of the mounted equipment.

An object of our invention is to provide a method of making a damper for a vibration isolator constructed entirely of material whose operation and endurance are not adversely affected by the extremely high and extremely low temperatures sometimes encountered in aircraft operation.

A still further object of our invention is to provide a method of making a damping means having an associated spring for insuring adequate functioning of the damper at vibration of relatively high frequencies and for preventing permanent deformation of the damping means.

An additional feature of our invention refers to the method for constructing a combined damper and spring referred to in the preceding paragraph.

Other objects and advantages of our invention will be apparent from the following detailed description taken in conjunction with the drawings wherein:

Figure 4 is an enlarged diagrammatic view of a portion of the foraminous material used to construct the damper.

Figure 5 illustrates the initial step in the manufacture of the damper shown in Figure 3.

Figure 6 shows the second step in the manufacture of the same damper.

Figure 7 is a cross section through the die used to form the damper, and shows the partially formed damper in position within the die.

Figure 1:
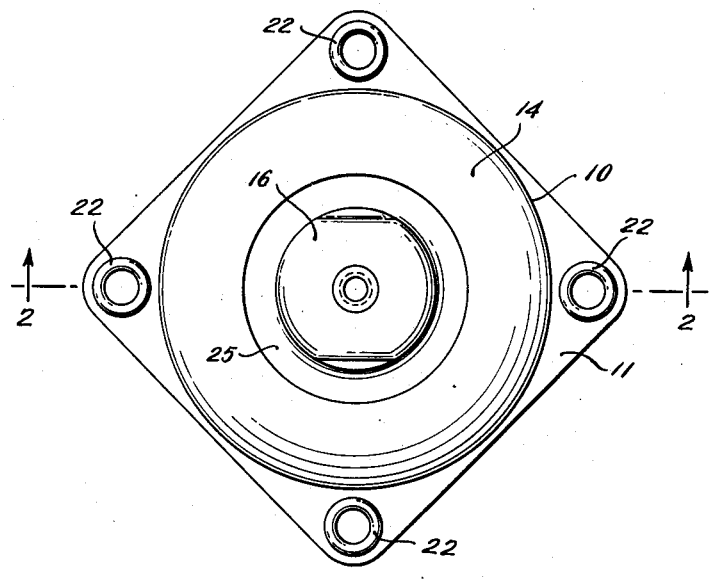
Figure 1 is a plan view of an isolator which includes preferred embodiment of damping means made according to the method of our invention.

The isolator includes a substantially cylindrical housing 10 with a lower peripheral flange 11 to which a bottom plate 13 is eyeletted. The upper wall 14 of the housing is provided with an opening through which one end of an inverted cup 16 is inserted. The main load supporting spring 17 extends between the bottom plate 13 and the inverted cup 16. The spring 17 is centered in the cup 16 by a tapped boss 19 swaged to the cup; it is located at its bottom end by another boss 20 riveted to the bottom plate 13. The mounted equipment is attached to the isolator by a bolt which threads into the tapped boss 19, and the isolator is attached to the aircraft structure by means of bolts extending through the eyelets 22.

The inverted cup 16 is provided with a peripheral flange 25 on its lower edge. A compliant damper 26 is arranged to encircle the lower part of the spring 17 and is confined between the peripheral flange 25 and the bottom plate 13. The damper is thus compressed by downward vibratory movement of the mounted equipment, and is permitted to extend when the vibrating body moves upwardly. The embodiment of the damper 26 shown in Figures 2 and 3 consists of the combination of a helical damper spring 28 and a body of compliant material 29 which may be formed, for example, by knitting corrosion resistant wire of small diameter. The knitted wire absorbs energy from the vibrating system as a result of the friction between the flexing strands of wire and as a result of the friction embodied in the rubbing of these wires on the coils of the spring 17.

The damper 26 is comprised of four principal parts. The central part 32 is substantially cylindrical in form, and is made preferably of relatively loosely knitted wire, which is free to deflect readily and thereby absorbs energy in friction from the vibrating system. The upper 33 and lower 35 parts are effectively flat washers, concentric with the center cylindrical part 32, and preferably formed integral therewith. The upper and lower parts are formed in such a manner that their density is substantially greater than that of the center cylindrical part 32. They engage flatways to provide a cushioned stop which limits downward movement of the mounted equipment. An inverted cup 36 of resilient material, preferably knitted wire pressed to the shape of the housing 10, is provided to cushion lateral and upward movement of the mounted equipment.

The helical damper spring 28 surrounds the center cylindrical part 32 of the damper, and functions to assure that the damper follows the inverted cup in its upward and downward vibratory motion.

Figure 2:
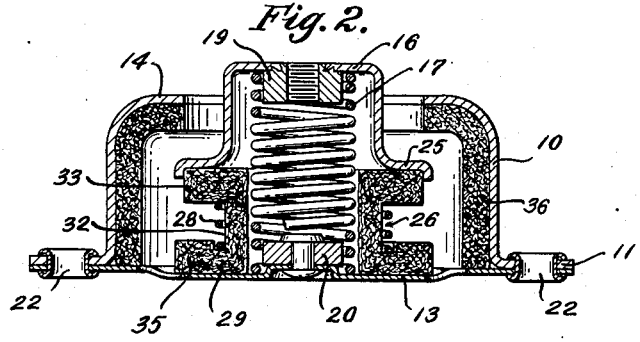
Figure 2 is a section on line 2—2 of Figure 1.
Figure 3:
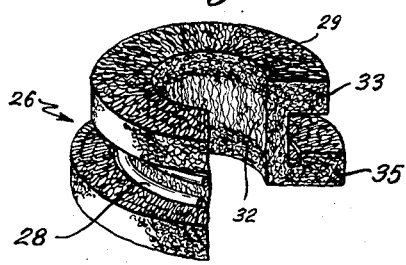
Figure 3 is a partially cut away perspective view of the damper that forms a part of the isolator illustrated in Figures 1 and 2.

A method of making the damper shown in Figures 2 and 3 is illustrated in Figures 4 to 7 inclusive. Foraminous material, preferably formed by knitting, may be in the form of a relatively long sock 37 of knitted wire, illustrated diagrammatically by the partial side view of Figure 4. This sock is drawn to the desired width by subjecting it to a tensile force in the long direction, and finally crimped along the spaced diagonal lines 40 to assure that the drawn width is held. A portion of the knitted sock, substantially longer than the damper spring 28, is then inserted through the spring as illustrated in Figure 5. The sock may be formed, if desired, from two or more thicknesses of knitted material. One method of making the damper involves rolling back the opposite ends 41, 42 of the sock to form the assembly illustrated in Figure 6. The assembly, as illustrated either in Figure 5 or in Figure 6, is then inserted in the die illustrated in Figure 7 and subjected to a large axial force. This force compresses the end portions 41, 42 of the sock to form the upper 33 and lower 35 parts illustrated in Figure 3.

One form of die which has been found useful for manufacturing the damper is illustrated in Figure 7. It is formed of an outer part 45 having a cavity 46 and an inner part 48 arranged to slide vertically into the outer part. The die also includes a split sleeve 49 having an annular cavity 51 for containing the damper spring 28. This split sleeve 49 is placed around the damper spring 28 shown in either Figure 5 or 6; and the assembly of split sleeve 49, damper spring 28 and foraminous sock 37 is then inserted in the cavity 46 in the outer part 45 of the die. Upon applying a downward force to the inner part 48, the portions 41, 42 of the foraminous sock adjacent the opposite ends of the assembly are compressed into the end cavities 53, 54 of the die. The portion 56 of the foraminous sock which is contained within the damper spring 28 is not subjected to the compressing force and thereby remains loosely woven for dissipation of energy as a result of friction. A modified form of die may involve a split sleeve of relatively large diameter, with the two axially moving compressing parts sliding within rather than around the split sleeve.

A modified form of damper that may be used is similar to that illustrated in Figure 6, except that the damper spring 28 has been omitted and the knitted material 41, 42 adjacent the ends is not compressed. It may be found suitable where the frequencies are relatively low and the damper spring is not required to cause the damper to maintain contact with the inverted cup. With this modification, it is possible to employ knitted wire of larger diameter which has the properties of affording adequate snubbing without being compressed to a great density.

While but one embodiment of our invention has been shown and described, it will be understood that many changes and modifications may be made therein without departing from the spirit and scope of the invention as defined in the appended claims.

We claim:

1. The method of making a damper comprising the steps of knitting a foraminous sock of flexible metallic strands, drawing the sock lengthwise to produce the desired width, crimping the sock at an angle to its length to maintain the drawn width, inserting the sock through a shorter coil spring, and turning at least one end of said sock upon itself to form a shape retaining toroid outwardly of an end of the spring.

2. The method of making a damper comprising the steps of knitting a sock of interlocked flexible wires, drawing the sock lengthwise to produce the desired width, crimping the sock at an angle to its length to maintain the drawn width, turning at least one end of said sock upon itself to form a toroid at one end thereof and increasing the density of said toroid by applying a compressive force to it while retaining the central portion at least of said sock relatively pliable.

3. The method of making a damper comprising the steps of inserting a relatively long foraminous sock formed from a plurality of flexible metallic strands through a shorter coil spring, turning both ends of said sock upon itself to form a pair of spaced shape retaining toroids, one outwardly of one end of the spring and the other outwardly of the other end of the spring, and applying a compressive force to said toroids while supporting the spring and the adjacent central section of the sock against compression.

4. The method of making a damper comprising the steps of inserting a relatively long foraminous sock formed from a plurality of flexible metallic strands through a shorter coil spring, turning at least one end of said sock upon itself to form a toroid adjacent to one end of the spring, and applying a compressive force to said toroid in a direction substantially parallel to the axis of the sock to compress the portion of the material forming said toroid and form it into a shape retaining flange of increased density at the end of the sock while retaining the central portion of the sock relatively pliable.

5. The method of making a damper comprising the steps of knitting a sock of interlocked flexible wires, turning at least one end of said sock upon itself to form a toroid at one end thereof, and applying a compressive force to said toroid in a direction substantially parallel to the axis of the sock to compress the portion of the material forming said toroid and form it into a shape retaining flange of increased density at the end of the sock while retaining the central portion of the sock relatively pliable.

References Cited in the file of this patent

UNITED STATES PATENTS

| Number | Name | Date |
| --- | --- | --- |
| 1,506,557 | Bird | Aug. 26, 1924 |
| 1,595,304 | Halbert | Aug. 10, 1926 |
| 1,872,229 | Blackmore | Aug. 16, 1932 |
| 2,032,659 | Hussman | Mar. 3, 1936 |
| 2,044,649 | Swennes et al. | June 16, 1936 |
| 2,153,388 | Newman | Apr. 4, 1939 |
| 2,276,572 | Gunn | Mar. 17, 1942 |
| 2,334,263 | Hartwell | Nov. 16, 1943 |
| 2,357,120 | Kuebert et al. | Aug. 29, 1944 |
| 2,361,139 | White et al. | Oct. 24, 1944 |
| 2,425,565 | Robinson | Aug. 12, 1947 |
| 2,462,316 | Goodloe | Feb. 22, 1949 |
| 2,519,702 | Robinson | Aug. 22, 1950 |
| 2,520,442 | Schwartz | Aug. 29, 1950 |
| 2,555,700 | O'Neil | June 5, 1951 |

FOREIGN PATENTS

| Number | Country | Date |
| --- | --- | --- |
| 21,050 | Great Britain | Sept. 16, 1912 |